United States Patent
Tayloe et al.

(10) Patent No.: US 8,050,189 B2
(45) Date of Patent: Nov. 1, 2011

(54) METHOD AND APPARATUS FOR DYNAMICALLY CHANGING A MAXIMUM ACCESS CHANNEL RATE

(75) Inventors: Daniel R. Tayloe, Phoenix, AZ (US); Chih-Ming J. Chiang, Chandler, AZ (US); Jonathan H. Gross, Gilbert, AZ (US); Mark T. Pflum, Chandler, AZ (US)

(73) Assignee: Motorola Mobility, Inc., Libertyville, IL (US)

( * ) Notice: Subject to any disclaimer, the term of this patent is extended or adjusted under 35 U.S.C. 154(b) by 662 days.

(21) Appl. No.: 12/177,353

(22) Filed: Jul. 22, 2008

(65) Prior Publication Data
US 2010/0020781 A1    Jan. 28, 2010

(51) Int. Cl.
*H04L 12/26* (2006.01)
(52) U.S. Cl. .................... 370/252; 370/338; 370/468
(58) Field of Classification Search .......... 370/241–253, 370/329, 338, 468
See application file for complete search history.

(56) References Cited

U.S. PATENT DOCUMENTS

| 7,072,327 | B2 | 7/2006 | Dick | |
|---|---|---|---|---|
| 7,215,681 | B2 | 5/2007 | Li | |
| 2005/0286440 | A1 | 12/2005 | Strutt | |
| 2007/0280130 | A1* | 12/2007 | Matsuo | 370/252 |
| 2008/0056125 | A1* | 3/2008 | Kneckt et al. | 370/229 |

FOREIGN PATENT DOCUMENTS
EP    1168873 A2    1/2002
* cited by examiner

*Primary Examiner* — Pao Sinkantarakorn

(57) ABSTRACT

A method, device and computer-readable storage element for dynamically changing a maximum access channel rate at a site in a communication system. The method includes setting a maximum access channel rate for an access channel at a site, which comprises a coverage area for a base station. The method further includes determining a first access probe success rate that measures a rate at which first attempt access probes sent from the terminals on the access channel are received, and changing the maximum access channel rate based on the first access probe success rate.

6 Claims, 3 Drawing Sheets

METHOD AND APPARATUS FOR DYNAMICALLY CHANGING A MAXIMUM ACCESS CHANNEL RATE

FIELD OF THE DISCLOSURE

The present disclosure relates generally to a wireless communication system and more particularly to a method and apparatus for dynamically changing a maximum access channel rate at a site in the wireless communication system.

BACKGROUND

A wireless communication system such as a $3^{rd}$ generation Code Division Multiple Access (3G CDMA) system is capable of enhancing end-user connectivity by providing a high speed "always on" wide area mobile environment. Push to talk (PTT) communication technology for 3G CDMA systems allows users to connect instantaneously with other PTT users anywhere in the world with just a press of a button. In addition, PTT enables one-to-one (private) and one-to-many (group) calls over the 3G CDMA network.

Presently, the PTT application uses a static maximum access channel rate assignment, where the default maximum access channel rate is set to a highest static rate, e.g., 38.4 kbps, to facilitate faster network access. The default maximum access channel rate is not changed over time. However, for the 38.4 kbps maximum access channel rate, PTT users in weak RF environments experience poor call set up time. On the other hand, if the maximum access channel rate is statically set to a lower rate, e.g., 9.6 kbps that remains constant over time, users in a good RF environment experience a delay in call set up.

Accordingly, there is a need for a method and apparatus for dynamically changing a maximum access channel rate to, for example, accommodate users in varying RF environments of the communication system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
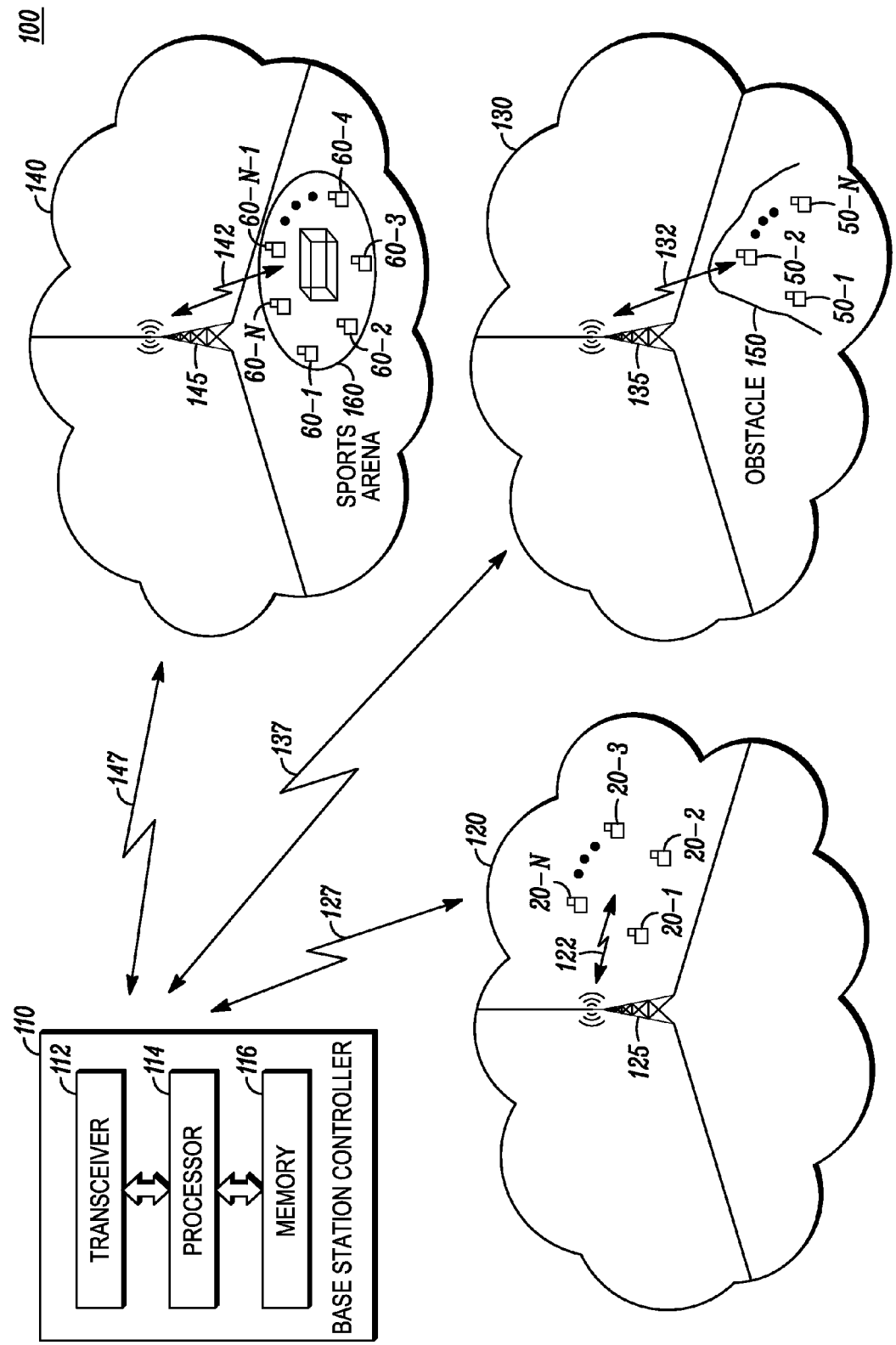
FIG. 1 is a block diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to the various embodiments, a method, device, and computer-readable storage element dynamically changes a maximum access channel rate at a site in a communication system. The method includes setting a maximum access channel rate for an access channel at a site, which comprises a coverage area for a base station. The method further includes determining a first access probe success rate that measures a rate at which first attempt access probes sent from the terminals on the access channel are received, and changing the maximum access channel rate based on the first access probe success rate. Advantages of the various embodiments include: decreasing call set up latency in a good radio frequency (RF) environment while simultaneously optimizing the maximum access channel rate for users in a poor RF environment, for improved connection setup reliability. Those skilled in the art will realize that the above recognized advantages and other advantages described herein are merely illustrative and are not meant to be a complete rendering of all of the advantages of the various embodiments.

Referring now to the figures, FIG. 1 is a block diagram of a communication system 100 in accordance with some embodiments. Communication system 100 comprises a base station controller (BSC) 110 and multiple base station wireless coverage areas 120, 130, and 140, also referred to herein as sites. The communication system 100 may comprise, but is not limited to, networks such as an Evolution Data Optimized (EVDO) network. EVDO is a telecommunications standard for the wireless transmission of data through radio frequency signals, typically for broadband Internet access. It uses multiplexing techniques such as CDMA as well as TDMA (Time Division Multiple Access), and it is standardized by $3^{rd}$ Generation Partnership Project 2 (3GPP2) as part of the CDMA2000 family of standards. EVDO was designed to co-exist with the CDMA2000 1X standard. The success of EVDO Release 0 (also designated as Telecommunication Industries Association (TIA)-856 Rev. 0 standard) led to the development of EVDO Revision A (TIA-856 Rev. A) and EVDO Revision B (TIA-856 Rev. B). Accordingly, reference to the EVDO standards used herein includes the standards and revisions mentioned above as well as subsequent revisions.

The teachings herein, however, are not limited to EVDO networks but can be applied to other types of networks using the same or different multiplexing technologies and that employ an access channel having a maximum access channel rate. Such networks may include, for example, CDMA 1x networks, Ultra Mobile Broadband (UMB) networks, Worldwide Interoperability for Microwave Access (WiMAX networks), Long Term Evolution (LTE) networks, Universal Mobile Telecommunications Service (UMTS) networks, High-Speed Downlink Packet Access (HSDPA) or HSDPA+ networks, or High-Speed Uplink Packet Access (HSUPA) networks, to name a few. In addition, only a single BSC and three coverage areas are shown for ease of illustration. However, the teachings herein can be implemented within a system comprising additional BSCs and more or fewer sites. Moreover, a site might be serviced by multiple base stations.

Returning again to the description of system 100, the BSC 110 is at least equipped with a transceiver (i.e., transmitter and receiver apparatus) 112, a memory 116 and a processing device 114 and is further equipped with any additional components as needed for a commercial embodiment. The transceiver 112, memory 116 and processing device 114 can have any suitable physical implementation and are topologically coupled depending on the particular device implementation. These components are further operatively coupled and can be adapted, arranged, configured, and designed to perform methods in accordance with the teachings herein, for example, as illustratively described by reference to the remaining FIGS. 2 and 3. Moreover, the BSC 110 can communicate with a packet data network (PDN) (not shown) such as, but not limited to, the Internet, through a PDN gateway (not shown) to further facilitate communications within system 100.

Each base station coverage area 120, 130, and 140 comprises at least one base station (BS) (e.g., 125, 135, and 145, respectively) and a plurality of access terminals (ATs or terminals, e.g., 20-1 . . . 20-N, 50-1 . . . 50-N, and 60-1 . . . 60-N, respectively). The base stations and ATs are also equipped with transceivers, memories and processing devices operatively coupled and adapted, arranged, configured and designed to carry out their functionality, including any functionality needed to implement the teachings herein. The BSs and ATs are further equipped with any other elements needed for a commercial embodiment.

As used herein, a BS is infrastructure equipment that can receive information (either control or media, e.g., data, voice, etc.) in a wireless signal from an AT and transmit information in wireless signals to one or more ATs via a communication link. A BS includes, but is not limited to, equipment commonly referred to as base transceiver stations, access points, routers or any other type of device interfacing an access terminal in a wireless environment. The base stations (at least) are included in what is referred to herein as the access network of the EVDO system.

As referred to herein, an AT includes, but is not limited to, devices commonly referred to as mobile radios, mobile stations, subscriber units, user equipment, mobile devices, or any other device capable of operating in a wireless environment. Examples of ATs include, but are not limited to, two-way radios, mobile phones, cellular phones, Personal Digital Assistants (PDAs), laptops and pagers.

Only a limited number of BSs and ATs are shown for ease of illustration. However, system 100 can include any number of BSs to support any number of ATs based on system requirements. Moreover, embodiments are not dependent on the applications and protocol(s) running on the devices in the system and used to facilitate communications in the system but can be used with any such applications and protocols. For example, in this illustrative embodiment the ATs and the access network can implement the PTT technology.

In general, communication links (also referred to herein as channels) comprise the physical communication resources over which information is sent between the elements within system 100. Communication links can be wireless or wired. For example, as illustrated in FIG. 1, BSC 110 communicates with base stations 125, 135, and 145 via channels 127, 137, and 147, respectively. In an embodiment, channels 127, 137, and 147 are wired links that are routed through a backhaul network (not shown) such as, but not limited to, a wired network or a Satellite.

Furthermore, ATs 20-1 . . . 20-N present in the coverage area 120 communicate with the BTS 125 through a channel 122. ATs 50-1 . . . 50-N present in the coverage area 130 communicate with the BTS 135 through a channel 132, and ATs 60-1 . . . 60-N present in the coverage area 140 communicate with the BTS 145 through a channel 142. In an EVDO system, channels 122, 132, and 142 each comprise a set of channels transmitted between the access network (the base station) and the access terminals within a given frequency assignment and comprises a forward channel and a reverse channel. The forward channel includes physical layer channels transmitted from the access network to the access terminals. The physical layer is the first layer of the well known Open Systems Interconnection (OSI) networking model and, in EVDO systems, provides the channel structure, frequency, power output, modulation, and encoding for the forward and reverse channels. The reverse channel includes the physical layer channels transmitted from the access terminals to the access network. The reverse channel includes a reverse access channel (also simply referred to herein as an access channel) that is used by an AT to communicate with the access network when no traffic channel has been assigned to the AT. The access channel is assigned a maximum access channel rate, which is defined as the maximum rate at which an AT can send information over the access channel to the access network. In accordance with an embodiment, the network side (e.g., the BSC 110 or the base station for a respective site) sets the maximum access channel rate for each site.

Figure 2:
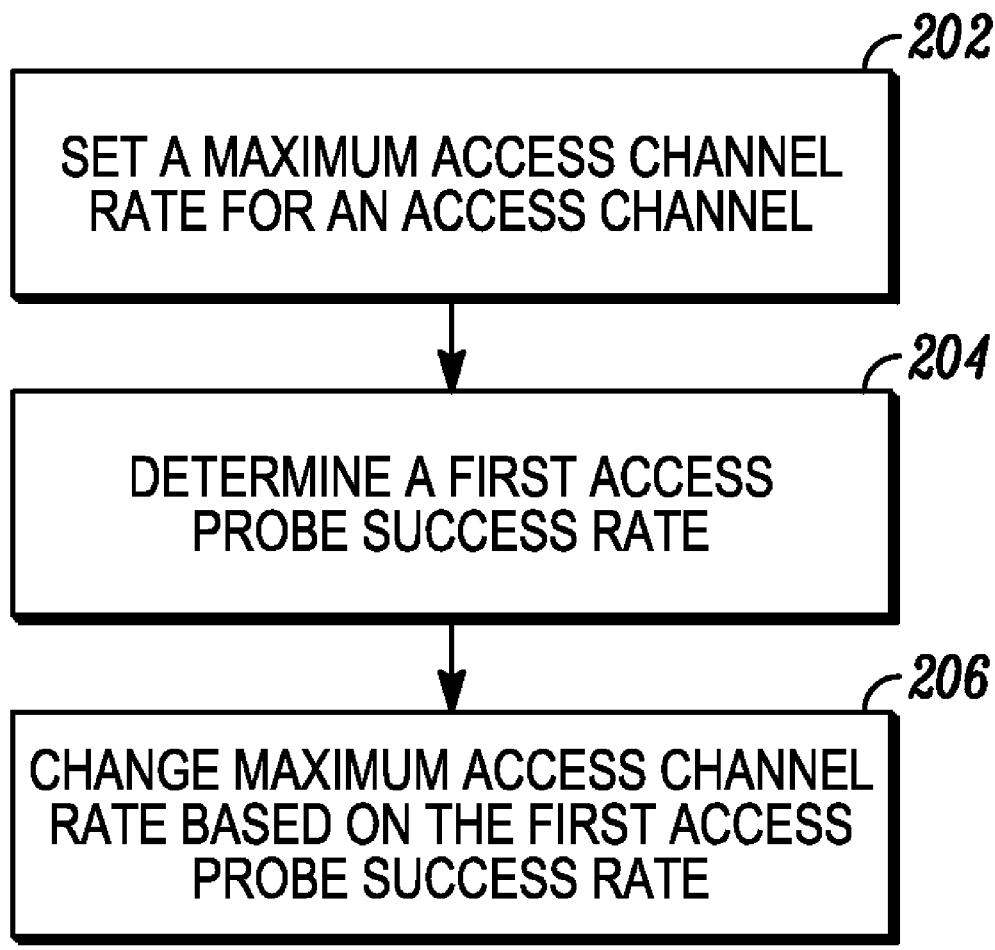
FIG. 2 is a flow diagram of a method in accordance with some embodiments.

FIG. 2 is a flow diagram of a method 200 in accordance with some embodiments. Method 200 is used by the access network, e.g., the BSC 110, the BSs 125, 135, and 145 or a combination thereof, to dynamically adjust the maximum access channel rate at a site in a communication system 100 based on a first access probe success rate. At 202, the access network sets a maximum access channel rate for the access channel at each site. In one embodiment, the access network sets the maximum access channel rate at a highest possible access channel rate allowable in the system to offer the fastest connection to the access channel. For example, the EVDO system allows access channel rates (also referred to in the EVDO standard as transmission rates) of 9.6, kilobits per second (kbps), 19.2 kbps and 38.4 kbps, wherein each transmission rate is associated with a minimum payload size in bits and a maximum payload size in bits.

Thus, in the above illustrative implementation, the access network initially sets (202) the maximum access channel rate to 38.4 kbps for each site 120, 130, 140. The access network communicates the maximum access channel rate to the ATs, for instance in accordance with the EVDO standard. However, any mechanism of communication is within the scope of the teachings herein. Having knowledge of the maximum access channel rate, each AT can determine the transmission rate that it will use for transmitting on the access channel, up to the maximum access rate set for the access channel. The ATs communicate their transmission rate to their respective BSs, for instance in accordance with the EVDO standard. However, any mechanism of communication is within the scope of the teachings herein. Upon selecting a transmission rate, the ATs can transmit information on the access channel such as access probes.

In this illustrative example, the EVDO standard specifies a structure and sequence for access probe transmission, wherein each access probe includes a preamble and payload. Access probes are used to initiate communication, and deliver initial messaging, over the access channel from the AT to the access network to, for example, notify the access network of a desire to use a traffic channel or to respond to a page from the access network. When an AT is allowed to transmit on the access channel, it can transmit one or more access probes in a sequence until one of the following conditions occur: the AT receives an acknowledgement (ACK) of receipt of an access probe from the access network; transmission is aborted; or a maximum number "N" of access probes has been transmitted for that sequence without the AT receiving an ACK from the access network. Once the AT receives the ACK, it sends no additional access probes during that sequence. As a consequence of the AT receiving the ACK, it ceases access channel message transmission based on the ACK providing confirmation that its initial message transmission has been received by the access network. It then awaits a further message response from the access network (such as a traffic channel assignment used in setting up a traffic channel connection).

In accordance with the teachings herein, the access network tracks at least some of these access probes to determine (204) a "first access probe success rate". More particularly, each access probe in a sequence is numbered (e.g., by the AT using any suitable method such as placing the information in a bit field in the access probe). Accordingly, during a first access probe transmission in a given sequence (e.g., a first attempt during a sequence at transmitting an access probe), the access probe is numbered "1". If no ACK is received, the AT transmits a second access probe in the sequence numbered "2". The AT continues to send (and number) the access probes for this sequence until one of the above conditions is met. Moreover, each AT at each site usually transmits a sequence (from 1 to M) of access probes when allowed to transmit on the access network. Thus, over some time period, the access network tracks a percentage of access probes that it receives (and correspondingly acknowledges) that were "first attempt access probes" or, in other words, access probes that were numbered first, e.g., numbered "1", in their corresponding sequences.

The time period may, for example, be set based on the time it takes for the access network to receive a predetermined number (e.g., 100) of first attempt access probes. In one example, during the time that it takes the access network to receive 100 first attempt access probes at a given site, the access network receives a total of 110 access probes numbered from 1 to M within their respective sequences. Thus, during this time period, the access network determines that the first access probe success rate for the site is 100/110=90.9%. The access network then uses the determined first access probe success rate to adjust (206) the maximum access channel success rate for that site, if necessary.

In one illustrative implementation, the access network compares the first access probe success rate to one or more thresholds to determine whether to adjust the maximum access channel rate up or down (i.e., to increase or decrease the maximum access channel rate). For example, if the first access probe success rate falls below a lower threshold (e.g., 90%), the access network decreases the maximum access channel rate for the site (until the lowest possible transmission rate is reached). If the first access probe success rate increases above an upper threshold (e.g., 98%), the access network increase the maximum access channel rate (until the highest possible transmission rate is reached). These upper and lower thresholds may be determined by simulation methods and may further be operator configurable to provide the designed level of performance in terms of first probe success rate in order to achieve low latency and reliable access channel messaging.

In the above-described illustrative implementation, the access network tracks a first access probe success rate and determines a corresponding maximum access channel rate separately for each site 120, 130, 140. However, a common or collective first access probe success rate can be tracked over all or some combination of the sites 120, 130, and 140 and a corresponding maximum access channel rate determined for the coverage area(s). This is a benefit for systems, or portions of systems, where the access channel loading is low and may thus benefit from improved statistical reliability from the sharing of data from multiple sites. However, a benefit of determining the maximum access channel rate separately for each site in accordance with the teachings herein is that varying RF environments between the different sites can be taken into consideration.

RF conditions can vary per site due to a number of factors including obstacles in the RF environment in the path of the RF signals being sent between the ATs and the BS at a given site or reverse link noise and interference conditions. FIG. 1, for instance, further illustrates an obstacle 150 at site 130 in between BS 135 and ATs 50-1 to 50-N, which may cause propagation delays and other interference to the RF signals, thereby, contributing to a poor RF environment for those ATs behind the obstacle. Under such poor RF conditions, ATs may have difficulty accessing the network to be assigned a traffic channel as reflected in the access network receiving an increasing number of access probes after multiple transmission attempts, thereby leading to a decreased first access probe success rate below the lower threshold at the site 130 with the obstacle. In that case, instead of decreasing the maximum access channel rate at all of the sites, the access network can decrease the maximum access channel rate only at site 130, while not affecting the maximum access channel rates (and latency) at the other sites that may have a better RF environment, for instance in coverage area 120 where most of the ATs are closer to the BS with no obstacles in between. Method 200 is iteratively performed over each subsequent time period.

Figure 3:
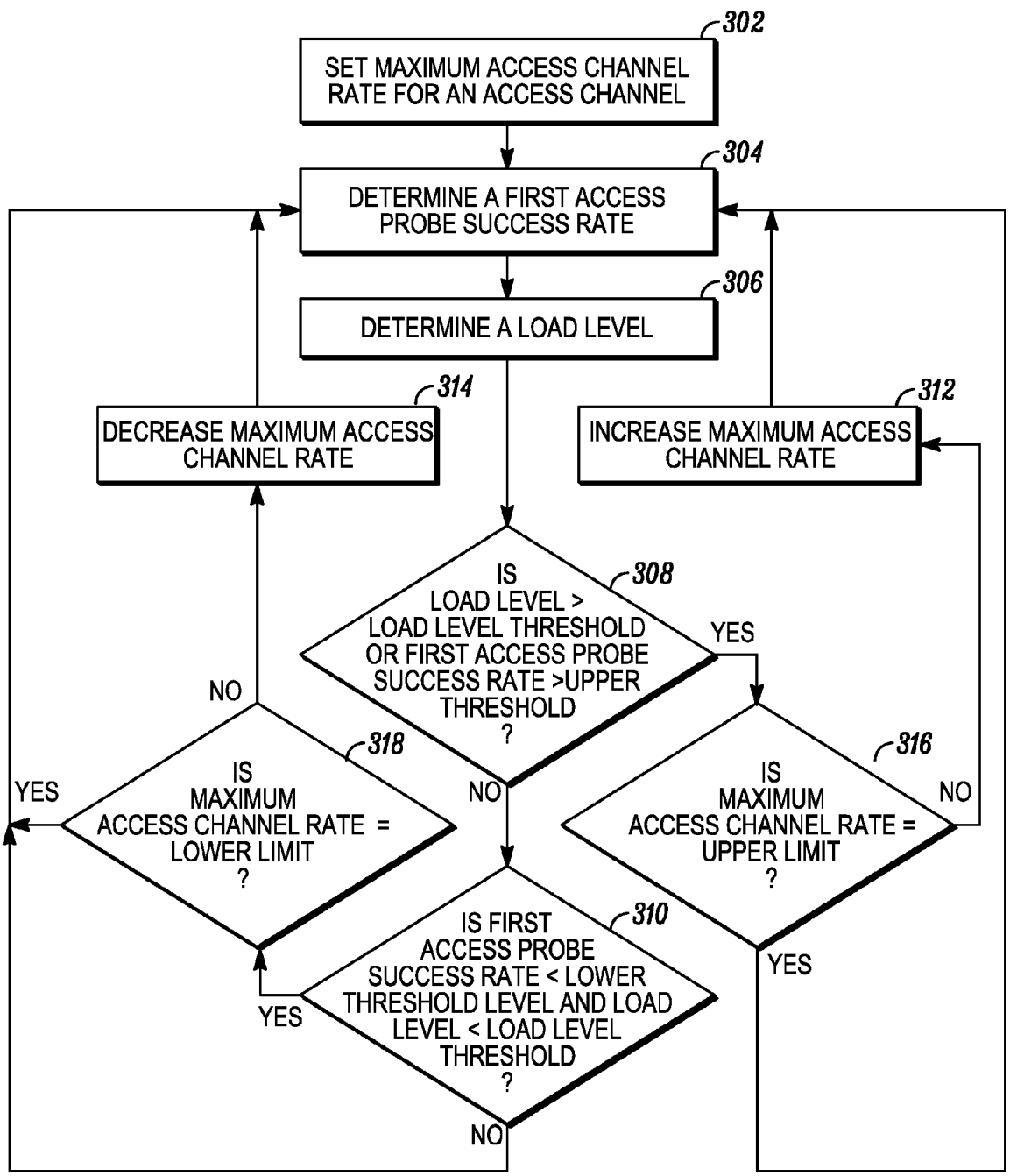
FIG. 3 is a flow diagram of a method of operation in a device in accordance with some embodiments.

FIG. 2 illustrated a method for adjusting the maximum access channel rate based only on the first access probe success rate. However, FIG. 3 illustrates another method 300 in accordance with the teachings herein for setting a maximum access channel rate at a site followed by steps for changing the maximum access channel rate at the site based on a first access probe success rate for the access channel or a load level for the access channel or both. Both the access probe success rate and the load level for the access channel are measured over time intervals, such that the maximum access channel rate can be varied based on the varying RF conditions and the varying load level, over time. The maximum access channel rate in an EVDO system is selected from one of 9.6 kbps, 19.2 kbps, or 38.4 kbps, as dictated by the current standard and as described above by reference to FIG. 2. However, other maximum access channel rates might be used, depending on the type of network in which the embodiments are implemented.

For a given access channel, the access network sets (302) an initial maximum access channel rate and also determines (304) a first access probe success rate in the manner described above by reference to FIG. 2. Method 300 further includes comparing (308, 310) the first access probe success rate with an upper threshold level and a lower threshold level to determine whether to adjust the maximum access channel rate. The access network increases (312) the maximum access channel rate if the first access probe success rate exceeds the upper threshold level (e.g., 98%) and is not at an upper limit transmission rate (316) and decreases (314) the maximum access channel rate if the first access probe success rate falls below the lower threshold level (e.g., 90%) and is not at a lower limit transmission rate (318).

In the instant embodiment, the method 300 of changing the maximum access channel rate is also based on load level and includes determining (306) a load level for the access channel and comparing (308, 310) the load level with a load level threshold. The load level may be a measurement of the access channel utilization based on the number or rate of access channel data (probes or messages) received. If the utilization is above a threshold (for example, 60%) then the access channel may be determined to have insufficient capacity, necessitating an increase in the access channel maximum rate and thus effective available access channel bandwidth. Further, the method 300 includes increasing (312) the maximum access channel rate if the load level is greater than the load level threshold (up to an upper limit transmission rate 316) and decreasing (314) the maximum access channel rate if the load level falls below the load level threshold (down to an lower limit transmission rate threshold).

Usually, when the maximum access channel rate is changed, it is increased or decreased to the next highest or next lowest transmission rate allowable by the system. However, this is not a necessity for proper functioning of the disclosed embodiments. For example, in an EVDO system if the maximum access channel rate for a site was set at 38.4 kbps and needed to be decreased, then it could be decreased to 19.2 kbps. Similarly, if the maximum access channel rate for a site was currently 9.6 kbps and needed to be increased, then it could be increased to 19.2 kbps.

In addition, when there is a conflict between changing the maximum access channel rate based on the first access probe success rate and changing the maximum access channel rate based on the load level, changing the maximum access channel rate based on the load level may take precedence. In yet another example as shown in FIG. 1, the base station coverage area 140 includes an area where access demand is higher than normal, such as in a sports arena 160, where there are multiple terminals 60-1 . . . 60-N present inside the sports arena trying to access a transmission channel. Some of the terminals 60-1 . . . 60-N may experience good RF coverage near the BTS 145, and some of the terminals 60-1 . . . 60-N might experience poor RF coverage, making the overall first access probe success rate decrease below the lower threshold. However, during the same time period, a large number of ATs may try to transmit on the access channel, thereby increasing the load level of the access channel above the load level threshold. In such a situation, the maximum access channel rate is increased despite that the first access probe success rate would lead to a lowering of the maximum access channel rate. This is done so that the maximum access channel rate can support the current channel demand regardless of the RF environment. Method 300 is iteratively performed over each subsequent time period.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for dynamically changing a maximum access channel rate at a site in a communication system, the method comprising:
    setting a maximum access channel rate for an access channel at a site which comprises a coverage area for a base station;
    determining a first access probe success rate that measures a rate at which first attempt access probes sent from the terminals on the access channel are received;
    changing the maximum access channel rate based on the first access probe success rate;
    determining a load level for the access channel; and
    changing the maximum access channel rate based on at least one of the first access probe success rate and the load level;
    wherein if there is a conflict between changing the maximum access channel rate based on the first access probe success rate and changing the maximum access channel rate based on the load level, then changing the maximum access channel rate based on the load level.

2. The method of claim 1 wherein changing the maximum access channel rate comprises:
    comparing the first access probe success rate to at least one threshold; and
    changing the maximum access channel rate based on results of the comparison.

3. The method of claim 2 wherein the at least one threshold comprises an upper and a lower threshold.

4. The method of claim 1 wherein the maximum access channel rate is selected from one of 9.6 kilobits per second (kbps), 19.2 kbps, or 38.4 kbps.

5. A device operable to dynamically change a maximum access channel rate at a site in a communication system, the device comprising:
    a transceiver; and
    a processing device coupled to the transceiver and programmed to perform a method comprising:
        setting a maximum access channel rate for an access channel at a site which comprises a coverage area for a base station;
        determining a first access probe success rate that measures a rate at which first attempt access probes sent from the terminals on the access channel are received;
        changing the maximum access channel rate based on the first access probe success rate;
        determining a load level for the access channel; and
        changing the maximum access channel rate based on at least one of the first access probe success rate and the load level;
        wherein if there is a conflict between changing the maximum access channel rate based on the first access probe success rate and changing the maximum access channel rate based on the load level, then changing the maximum access channel rate based on the load level.

6. The device of claim 5 wherein the processing device is further programmed to perform:
    comparing the first access probe success rate to at least one threshold; and
    changing the maximum access channel rate based on results of the comparison.

* * * * *